United States Patent
DeLuca et al.

(10) Patent No.: US 9,600,595 B2
(45) Date of Patent: Mar. 21, 2017

(54) MODIFICATION OF WINDOWS ACROSS MULTIPLE DISPLAYS

(71) Applicant: International Business Machines Corporation, Armonk, NY (US)

(72) Inventors: Lisa Seacat DeLuca, Baltimore, MD (US); Dana L. Price, Cary, NC (US); Shelbee D. Smith-Eigenbrode, Thorton, CO (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 13/898,559

(22) Filed: May 21, 2013

(65) Prior Publication Data

US 2014/0351721 A1    Nov. 27, 2014

(51) Int. Cl.
*G06F 3/048* (2013.01)
*G06F 17/30* (2006.01)
(Continued)

(52) U.S. Cl.
CPC ...... *G06F 17/30905* (2013.01); *G06F 3/1423* (2013.01); *G06F 9/4443* (2013.01);
(Continued)

(58) Field of Classification Search
CPC .......... G06F 17/3089; G06F 17/30873; G06F 3/0481; G06F 3/1423; G06F 1/16;
(Continued)

(56) References Cited

U.S. PATENT DOCUMENTS 5,434,964 A * 7/1995 Moss et al. .................... 715/788
5,675,755 A * 10/1997 Trueblood .................... 715/791
(Continued)

FOREIGN PATENT DOCUMENTS

JP          10187110 A      7/1998
JP        2006030379 A      2/2006
WO    WO 2007038283 A2 *   4/2007

OTHER PUBLICATIONS

"Monitor Configuration"; displayfusion multiple monitors made easy; Copyright 2013 Binary Fortress Software; Printed Feb. 13, 2013; <http://www.displayfusion.com/Features/MonitorConfig/>.
(Continued)

*Primary Examiner* — Patrick Riegler
*Assistant Examiner* — Alex Olshannikov
(74) *Attorney, Agent, or Firm* — Edward J. Wixted, III (57) ABSTRACT

In a method for redrawing a two web page windows that are being moved from a first display screen to a second display screen, an indication is received that each respective web page window is being moved from a first display to a second display. A processor identifies different scaling factors corresponding to uniform resource locators (URLs) of each respective web page window for scaling the web page windows for display on the second display screen. The processor causes the first web page window to be scaled according to the first scaling factor and the second web page window to be scaled according to the second, different scaling factor, wherein each web page window is scaled differently relative to the other on the second display screen than on the first display screen.

20 Claims, 6 Drawing Sheets

(51) Int. Cl.
*G06F 3/14* (2006.01)
*G06F 9/44* (2006.01)
*G06F 17/21* (2006.01)

(52) U.S. Cl.
CPC ........ *G06F 17/211* (2013.01); *G09G 2340/04* (2013.01); *G09G 2340/14* (2013.01)

(58) Field of Classification Search
CPC .... G06F 17/211; G06F 3/048; G06F 3/04845; G06F 17/30905; G06T 3/40; G09G 2340/04; G09G 2340/14; G09G 2340/0407; G09G 2370/042; G09G 5/26; G09G 5/373
USPC ....... 715/760, 800, 801, 863, 788, 798, 799, 715/803; 345/660, 1.1
See application file for complete search history.

(56) References Cited

U.S. PATENT DOCUMENTS

| | | | |
|---|---|---|---|
| 6,300,947 B1* | 10/2001 | Kanevsky | 715/866 |
| 6,452,641 B1 | 9/2002 | Chauvel et al. | |
| 7,546,540 B2 | 6/2009 | Baudisch et al. | |
| 2002/0010723 A1* | 1/2002 | Nielsen | 707/529 |
| 2003/0107604 A1 | 6/2003 | Ording | |
| 2004/0263426 A1 | 12/2004 | Endo | |
| 2005/0188298 A1* | 8/2005 | Makela | 715/503 |
| 2005/0193053 A1* | 9/2005 | Kendall et al. | 709/200 |
| 2008/0030425 A1 | 2/2008 | Fullerton et al. | |
| 2009/0201308 A1* | 8/2009 | Graf | G06F 3/14 345/581 |
| 2009/0303253 A1* | 12/2009 | Flake | G06F 17/30899 345/660 |
| 2010/0138780 A1* | 6/2010 | Marano | G06F 3/1415 715/804 |
| 2014/0365911 A1* | 12/2014 | Smith | H04N 1/00973 715/747 |

OTHER PUBLICATIONS

"Media Chance" MultiMonito TaskBar; Copyright 2010 Mediachance; Printed Feb. 13, 2013; <http://www.mediachance.com/free/multimon.htm>.

"UltraMon"; Realtime Soft UltraMon; Copyright 2000-2013 Realtime Soft Ltd.; Printed Feb. 13, 2013; <http://www.realtimesoft.com/ultramon/>.

* cited by examiner

MODIFICATION OF WINDOWS ACROSS MULTIPLE DISPLAYS

FIELD OF THE INVENTION

The present invention relates generally to computer operating systems, and more specifically to transferring a window from one display device to another display device, under control of an operating system.

BACKGROUND

A computing device may be capable of creating an image on a broad range of display devices. These display devices may be different sizes and have different image rendering capabilities. A user may wish to use multiple displays with a single computing device in order to increase that computing device's utility. For instance, a laptop may be connected to a television in order to show a video on a larger screen or to enhance image quality, or the laptop computer may be connected to two or more external display devices.

One particular use of multiple displays is in a multi-display setup. A multi-display setup involves the use of multiple physical display devices, such as monitors, projectors, tablets, and televisions in order to increase the area available for computer programs running on a single computer system. Typically, a multi-display setup will involve two or more physical display devices positioned so as to increase the available viewing area of the computer desktop.

The graphical user interface (GUI) of a computer may allow a user to draw and move windows on the display devices in a desktop environment through the use of a mouse, keyboard, touch sensor, or other input device. The user may be able to drag a window from one display screen to another display screen (of the same or different size, resolution, aspect ratio and color capabilities), using a window manager program such as Microsoft™ Desktop Window Manager. The Desktop Window Manager (DWM) program in Microsoft® Windows® operating system will typically control the placement and appearance of windows within the desktop environment. Multiple-display desktop environments have many well-known features and advantages.

The physical display devices used in a multi-display setup may be different types (liquid-crystal display, cathode ray tube, etc.) and sizes. The displays may have different capabilities with regards to resolution, color, or refresh rate. The operating system typically will manage the physical display devices independently.

Generally, when a computing device utilizes multiple displays of different resolutions, sizes, or capabilities, a window transferred from one display device to another display device will have a somewhat different appearance on each display. For example, when moving a window from a high resolution display to a low resolution display with a known window manager, when each display is of equal physical dimensions, the window will be much smaller on the high resolution display than the low resolution display. Alternatively, a computing system with a known window manager may operate so that a window will take up the same proportional size of the screen on the first and second display, regardless of the resolution.

A user may be able to change display settings of a window. Colors may be changed from normal to high contrast modes to assist a user reading text. Content may be enlarged in a uniform or nonuniform manner within the window. For example, some web browsers allows for the selection of a minimum font size, as well as an ability to increase the size of both the font and images. Changing these and other display settings may allow a user to optimize viewing preferences on displays with different display capabilities.

SUMMARY

Aspects of an embodiment of the present invention disclose a method, computer program product, and computing system for redrawing a first web page window and a second web page window that is being moved from a first display screen to a second display screen. An indication that each respective web page window being moved from a first display screen to a second display screen is received. A processor identifies a first scaling factor corresponding to a uniform resource locator (URL) of the first web page window for scaling the first web page window for display on the second display screen and a second, different scaling factor corresponding to the second URL of the second web page window for scaling the second web page window on the second display screen. The processor causes the first web page window to be scaled according to the first scaling factor and the second web page window to be scaled according to the second, different scaling factor, wherein each web page window is scaled differently relative to the other on the second display screen than on the first display screen.

DETAILED DESCRIPTION

The present invention will now be described in detail with reference to the Figures.

Figure 1:
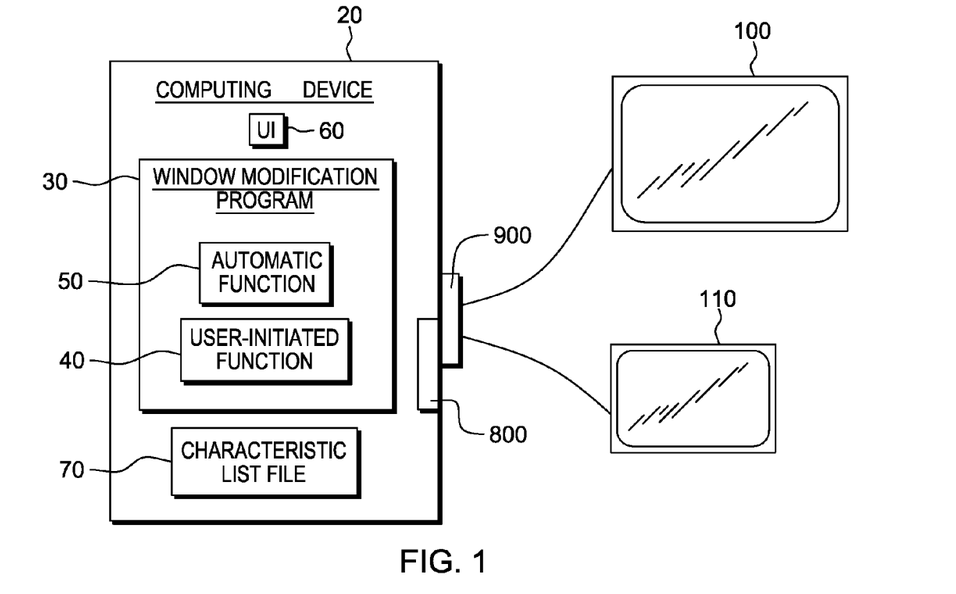
FIG. 1 depicts a diagram of a computing system in accordance with one embodiment of the present invention.

FIG. 1 depicts a diagram of computing system 10 in accordance with one embodiment of the present invention for redrawing a window transferred from a first display screen 100 to a second display screen 110. FIG. 1 provides only an illustration of one embodiment and does not imply any limitations with regard to the environments in which different embodiments may be implemented.

In the depicted embodiment, computing system 10 includes computing device 20, first display 100, and second display 110. Computing system 10 may also include a network, server computers, client computers, or other devices not shown.

Computing device 20 may be a laptop computer, tablet computer, netbook computer, personal computer (PC), a desktop computer, a personal digital assistant (PDA), or smart phone. In general, computing device 20 may be any electronic device or computing system capable of executing computer code and outputting an image to at least two different physical display devices. First display 100 and second display 110 may be any combination of standalone devices such as monitors or televisions connected to computing device 20, or other devices integrated with computing device 20, such as the display on a tablet or smartphone. Computing device 20 may include internal 800 and external 900 components as depicted and described in further detail with respect to FIG. 7.

A user interface (UI) 60 operates on computing device 20 to generate display signals corresponding to content, such as windows, menus, and icons, and to receive various forms of user input. In one embodiment, UI 60 comprises an interface to user-initiated function 40 of window modification program 30. UI 60 may display data received from user-initiated function 40 and send input to user-initiated function 40. UI 60 may comprise one or more interfaces such as, an operating system interface and/or application interfaces. A window manager may work with the underlying graphical system to control the placement and appearance of windows appearing on UI 60.

Computing device 20 also contains window modification program 30 and characteristic list file 70 according to the present invention. Window modification program 30 executes on computing device 20 and is capable of executing user-initiated function 40 and automatic function 50 to redraw the window being transferred to display screen 110. Window modification program 30 operates to adjust display settings of the window being transferred and may adjust the size of parts of the window, such as the text, or the entire window when displayed on display screen 110. In one embodiment, window modification program 30 includes two functions: user-initiated function 40 and automatic function 50.

Adjustable display settings of the window may include a scaling factor, font type, font size, level of content zoom within the window, and the width and height of the window in pixels. A scaling factor is any number which scales or multiplies an aspect of the window. For example, a scaling factor may increase or decrease the size of the window, the size of the contents of the window, or the size of particular objects within the window, such as text or images. Other adjustable display settings include color, contrast, or digital brightness. Adjustable display settings may apply to the entire window or to a particular type of object within the window, such as text. Objects within a window may include text, images, videos, or any other objects embedded in the window.

Objects within a window, such as text, may be independently scaled in some windows. For example, web pages created using HyperText Markup Language (HTML), applications created using Extensible Markup Language (XML), and documents created with other markup languages may allow for the independent scaling of text and other objects within a window.

User-initiated function 40 operates to adjust and customize the display settings of a window on a display and to store the display settings for use by automatic function 50. In one embodiment, user-initiated function 40 may adjust the display settings of the window based on display setting input from a user. User-initiated function 40 may communicate with a user through UI 60. User-initiated function 40 may cause a display setting request to be displayed in UI 60 in the form of a popup window or modal window. A modal window is a child window that requires users to interact with it before they can return to operating the parent application. Once user-initiated function 40 receives the selected display settings from UI 60 it will redraw the window in accordance with the received display settings.

User-initiated function 40 may cause a save preference request to be displayed in UI 60 in the form of a popup window or modal window. In one embodiment, the save preference request may be contained in the same popup window or modal window as the display setting request. Based on save preference information received, user-initiated function 40 may write the received display settings to characteristic list file 70. If save preference information received indicates that a user wishes to save the settings for future use, user-initiated function 40 will write the received display settings to characteristic list file 70. If save preference information received does not indicate that a user wishes to save the settings for future use, user-initiated function will not write to characteristic list file 70. Save preference information written to characteristic list file 70 may include information about the contents of a window and display settings to be applied to the window when the window is displayed on the physical display. For example, save preference information written to characteristic list file 70 may include a lower level domain or a specific uniform resource locator (URL) to a web page along with display settings to be applied to the respective window when the window is displayed on the physical display. Save preference information written to characteristic list file 70 may also include information about a physical display, such as driver details or display device identification information.

Characteristic list file 70 may be a data file, configuration file or collection of configuration files that may be written and read by window modification program 30. In one embodiment, characteristic list file 70 is located on computing device 20. In other embodiments, characteristic list file 70 may be located on a server, or another computing device, provided that characteristic list file 70 is accessible to window modification program 30. In one embodiment, characteristic list file 70 includes information about a physical display, information about the contents of a window, and the display settings applied to the window or objects embedded within the window, when the window is displayed on the physical display. Characteristic list file 70 may store display settings that correspond to a specific file or URL displayable on the physical display. In another embodiment, a set of display settings may correspond to a file type, program, object within a window, or lower level domain displayable on the physical display.

Embodiments of characteristic list file 70 may be customizable by a user. Some embodiments of characteristic list file 70 may contain sets of stored display settings that correspond to particular window content information across multiple display types. In some embodiments, stored display settings may correspond to a particular display. In other embodiments, stored display settings may correspond more generally to certain display properties (e.g., size, aspect ratio, resolution, type, color capabilities, etc.). For example, minimum font size settings may be stored to characteristic list file 70 that correspond to different display sizes, display resolutions, and display size-display resolution combinations.

Automatic function 50 operates to redraw a window according to stored display settings after the window has been moved to a different display in a multi-display setup. In one embodiment, automatic function 50 receives an indication that a window has been moved from first display 100 to second display 110. Automatic function 50 accesses characteristic list file 70 and redraws the window according to stored display settings that correspond to that window and display 110. If characteristic list file 70 does not contain display settings for the window displayed on display 110, automatic function 50 redraws the window according to default settings of the operating system or window manager of computing device 20.

In another embodiment, automatic function 50 may operate to receive information about the display and the window contents anytime a new window is opened, in addition to when a window has been moved to a different display. For instance, a desktop computer may be run on any number of displays and a user may have chosen different display settings for each display. When a window is opened, automatic function 50 may receive information about the display and the window contents. Automatic function 50 may access characteristic list file 70 based upon the received information. Automatic function 50 may then proceed to redraw and potentially store display settings according to the steps previously described.

Figure 2A:
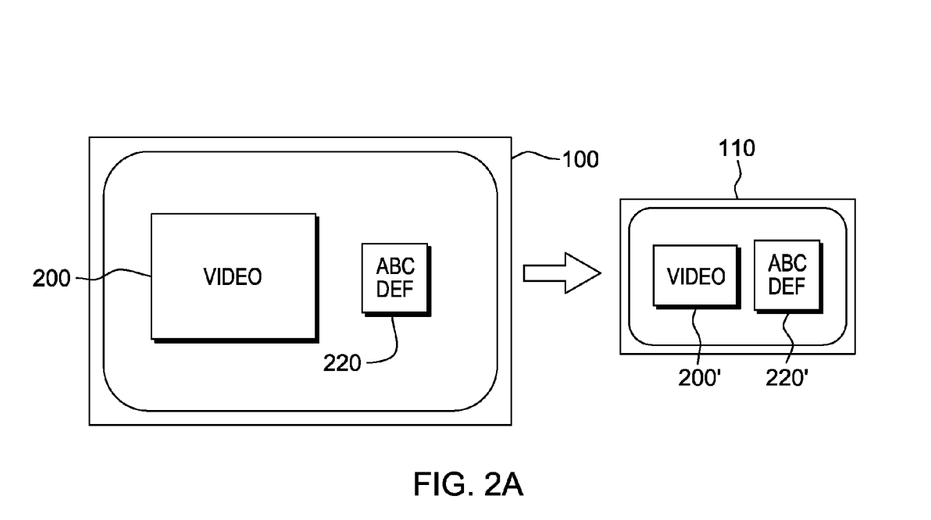
FIG. 2A shows the effects of moving windows from a first display to a second display in the computer system of FIG. 1 according to one embodiment of the present invention.

FIG. 2A shows an example of two windows that have been moved from a first display to a second display according to one embodiment of the present invention.

Before the move of FIG. 2A is performed, the user has set several display settings. For any and all windows that display digitized alphanumeric characters (herein called text windows, not to be confused with windows that display images which may include text), the user has established the following preferences using UI 60: the text window will maintain constant scope and zoom, i.e. the text will maintain the same physical size on each display, as it is moved from one device to another in a multi-display setup, the text window will maintain a constant height and width as it is moved from one device to another in a multi-display setup, and the text window's resolution (i.e., pixels per window) may be freely changed, in order to accommodate other rules as it is moved from one device to another in a multi-display setup. For example, if the resolution of display screen 110 is half that of display screen 100, and the size of display screen 110 is the same as the size of display screen 100, then the transferred text window on display screen 110 will be double in height, width, and content scope as the same window on display screen 100.

For video windows, the user has further established the following preferences using UI 60: the video window brightness will be set to 95% when it is moved to the second display, when the video window is moved from one device to another in a multi-display setup, the window will maintain constant aspect ratio, e.g., 16:9, and when the video window is moved from one device to another in a multi-display setup, the window size to screen size proportions shall remain constant. So, if display screen 100 has double the area of display screen 110, the transferred video window will have double the area on display screen 100 as on display screen 110.

After the user establishes these preferences and they are stored in characteristic list file 70 by user-initiated function 40 executing on computing device 20, the window moves are made as shown in FIG. 2A.

FIG. 2A shows first display 100 and second display 110. In this example, first display 100 has a larger physical viewing area but a lower resolution than second display 110. Display settings have been received and stored by user-initiated function 40 for text window 220 as it is moved and displayed on second display 110 that will allow text window 220 to maintain similar physical dimensions and content scope or zoom when it is redrawn as text window 220' on second display 110.

A particular benefit of this arrangement may be that the window will have a similar level of readability for a user regardless of which display the window is drawn upon. In the present embodiment, this set of display settings will only be automatically applied when text window 220 is drawn as text window 220' on second display 110. When text window 220' is moved to first display 100, it will be redrawn with the dimensions and scope it originally maintained as text window 220. In some embodiments, display settings may be stored so that they are also applied to a window when it is displayed on any display having similar properties to those of the display corresponding to the display settings. Such properties may include, but are not limited to, physical size, display resolution, aspect ratio, refresh rate, and color capabilities of the display. A window may correspond to stored display settings because its contents may be of a particular file type, program, application, or the window may contain a particular type of data (i.e., video, text, spreadsheet).

Video window 200 is a window that does not correspond to the same set of stored display settings as text window 220. When video window 200 is moved to second display 110 and redrawn as video window 200', it is drawn with different display settings than are applied when text window 220 is drawn as text window 220' on second display 110. An additional display setting or set of customized settings could be selected, stored and applied to video window 200 when moved to second display 110. Alternatively, no display settings may be selected and video window 200 would be redrawn according to default operating system or window manager settings of computing device 20. Default operating system or window manager settings of a computing device can vary in how they manage windows. Typically, the default operating system or window manager will redraw a window that has been moved to a second display, such as display 110, by drawing the window according to the same pixel dimensions; however, other default settings exist.

Figure 2B:
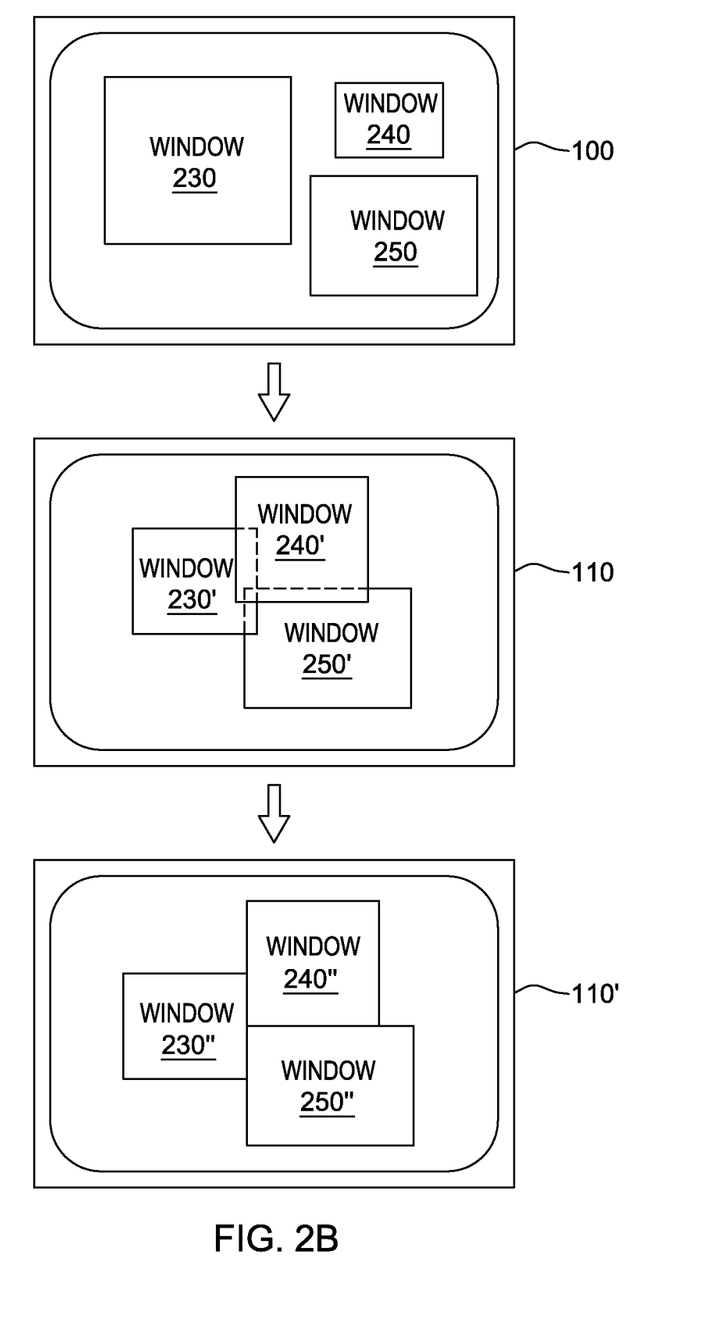
FIG. 2B shows the effects of moving windows from a first display to a second display in the computer system of FIG. 1 according to an additional embodiment of the present invention.

FIG. 2B shows an example of three windows that have been moved from a first display to a second display according to one embodiment of the present invention.

Before the move of FIG. 2B is performed, the user has set several display settings. The user has established scaling factors for window 230, window 240, and window 250 for scaling the size of each respective window on display 110 using UI 60. In this embodiment, a scaling factor of less than one means the window will shrink, a scaling factor of greater than one means the window will grow, and a scaling factor of one means the window will be left unchanged when moved to the display where the scaling factors take effect. Window 230 has been assigned a scaling factor of less than one, window 240 has been assigned a scaling factor of greater than one, and window 250 has been assigned a scaling factor of one. In this example, each window is a webpage window addressed by a URL. The user has assigned scaling factors to each window based upon the URL of the webpage window. Using UI 60, the user has also selected an option that will prevent overlap of web pages due to window resizing when windows are moved from a first display to a second display.

After the user establishes these preferences and they are stored in characteristic list file 70 by user-initiated function 40 executing on computing device 20, the window moves are made as shown in FIG. 2B.

FIG. 2B shows a first display 100 and second display 110. First display 100 and second display 110 may be different sizes or have different display capabilities. Display settings, more specifically scaling factors, have been received and stored by user-initiated function 40 for window 230, window 240, and window 250, as previously discussed.

In the present embodiment, these display settings will only be automatically applied when windows 230, 240, and 250 are moved to display 110 and drawn as windows 230', 240', and 250'. Due to the assigned scale factors, window 230' is smaller than window 230, window 240' is larger than window 240, and window 250' is the same size as window 250. Because of where the windows have been positioned on display 110 and how the respective scale factors have resized each window, there is now a window overlap on display 110. In this example, the user has selected an option that will prevent window overlap by moving or resizing the moved windows.

Display 110' is the same physical display as display 110. Display 110' illustrates the results of the user selected option to prevent window overlap. In this example, windows 230", 240", and 250" have each retained their respective sizes (see windows 230', 240', and 250', respectively) from their initial moves to display 110, however, they have been repositioned to eliminate overlap. Repositioning and resizing windows to eliminate overlap will be discussed in further detail with regards to FIG. 3.

Figure 3:
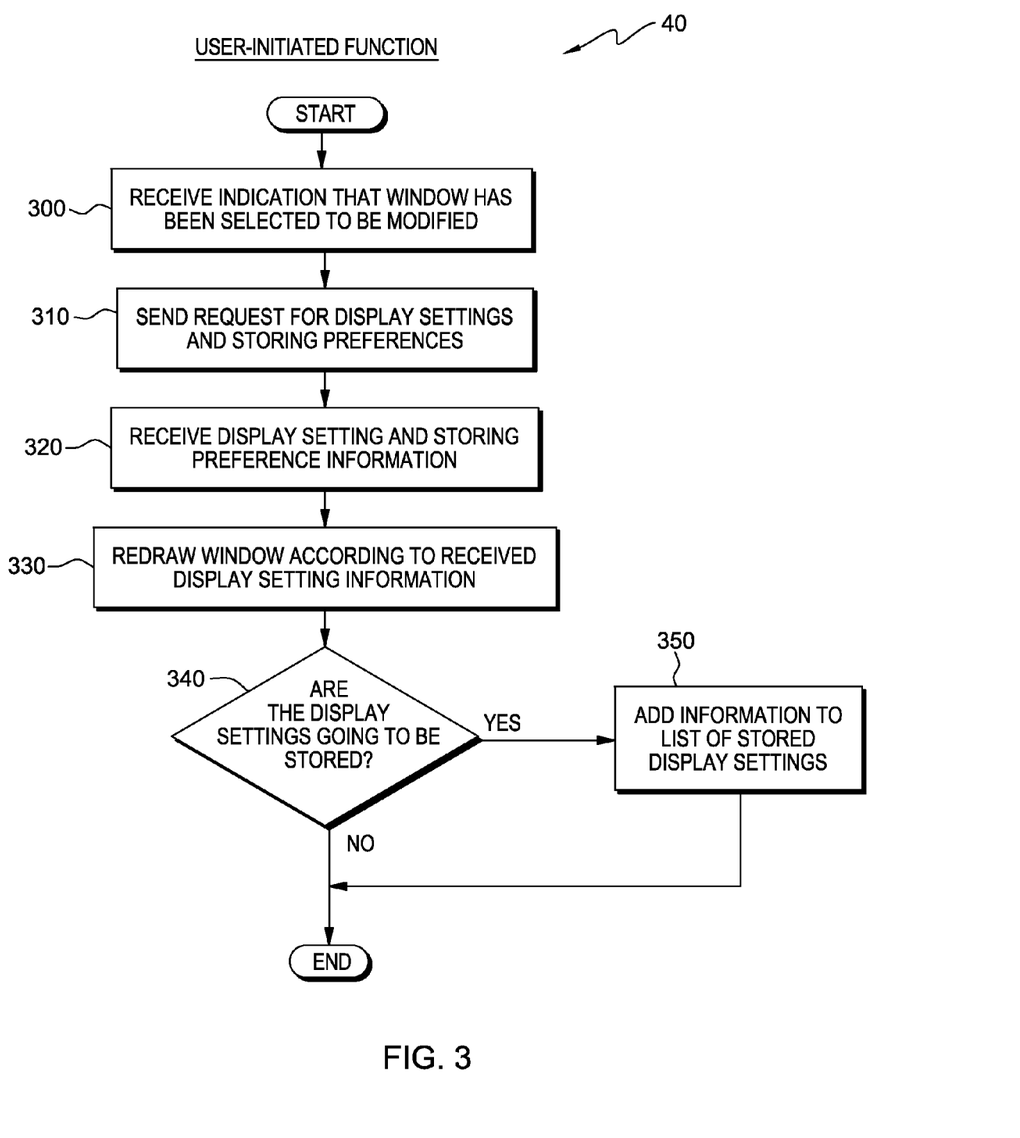
FIG. 3 depicts a flowchart of the steps of a window modification program executing a user-initiated function within the computing system of FIG. 1, for redrawing a window according to display settings selected by a user in accordance with one embodiment of the present invention.

FIG. 3 depicts a flowchart of the steps of user-initiated function 40 of window modification program 30 executing within computing system 10 of FIG. 1, for redrawing a window according to display settings selected by a user, in accordance with one embodiment of the present invention.

In one embodiment, initially, a user at computing device 20 opens a desktop window such as a web browser, text document, application, or picture using UI 60 on second display 110. The user then selects an option to modify the window. The option may be available to the user through a toolbar displayed in UI 60. In other embodiments, the option may be available to the user through a menu, hotkey, gesture, or voice command. The selection of the option causes UI 60 to send a notification that a window has been selected to be modified to user-initiated function 40 of window modification program 30.

In step 300, user-initiated function 40 receives a notification from UI 60 that a window has been selected to be modified. In response to receiving the notification, user-initiated function 40 sends a request to UI 60 for the user to input display settings for the window on second display 110 (step 310). The request for display settings will typically be sent to a user through UI 60. In one embodiment, the request is sent in the form of a modal window or popup window. Other embodiments may use voice recognition software, gestures, or other means of transmitting and receiving data to and from a user. The display settings requested may include scaling factor, font type, font size, minimum font size, window width (pixels), window height (pixels), content scope or zoom, contrast, digital brightness, or other color settings.

In step 310 user-initiated function 40 will also send a request for display setting save preferences to UI 60. The save preference request may be sent to a user by the same means as the request for display settings and, in some embodiments, may be embedded into the same modal window or popup window. Display settings chosen to be saved will be added to a list of stored display settings to be stored on characteristic list file 70 of FIG. 1. Saved display settings will include information about the display properties and will include information about at least some aspects of the window content. A save preference request may be simple, and only link the display settings to a specific URL or file. Alternatively, the save preference request may allow for the linking of display settings to all of a certain file type, program, application, web browser, or lower level domain. The save preference request may link display settings to a certain aspect of an object within a window. For instance, the save preference request may correspond to all windows containing text smaller than 10 point font. Additionally, the save preference request may allow for the storing of display settings for groups of files or all files within a specified folder. The utilization of the list of stored display settings will be further discussed with respect to automatic function 50 and FIG. 6.

In step 320, user-initiated function 40 receives the display settings for the window on second display 110 and a set of storing preferences for the display settings from UI 60. In response, user-initiated function 40 redraws, or instructs the operating system to redraw the selected window on second display 110 according to the received display settings (step 330). For example, the display settings received for the window on second display 110 may include a specific minimum font size, and height and width dimensions of the window (pixels). The display settings may correspond to the window based upon some aspect of the contents of the window, such as the URL of a web page displayed within the window. Having received the specific display settings, user-initiated function 40 may then redraw the window according those settings (step 330). In one embodiment, if the selected pixel height and width of the window is greater than the viewable content area of the display, user-initiated function 40 will redraw the window full screen on the display. In another embodiment, user-initiated function 40 will redraw or instruct the operating system to redraw the window according to the specified window dimensions regardless of the available viewable content area of the display.

In one embodiment of the present invention, window modification program 30 will determine if there is a window overlap when two or more windows have been moved from the first display to the second display. Two or more windows may overlap on the second display when they did not overlap on the first display as a result of stored display settings related to window size or differences between the two displays, such as size, resolution, or aspect ratio. For example, if one or more windows are enlarged relative to the total screen size, they will occupy a greater area than in the original screen, and may overlap adjacent windows (which may or may not have been enlarged). If two or more windows overlap after the enlargement of a window, window modification program 30 may resize (i.e. make smaller) the adjacent window or move one or more of the adjacent window away from the enlarged window or move the enlarged window away from the adjacent window in order to reduce or eliminate window overlap. An example of window overlap, and moving windows to account for that overlap, is illustrated in FIG. 2B.

Window modification program 30 may determine that there is window overlap by using stored coordinate and window dimension information. In some embodiments, location and dimension information for each window in a desktop environment may be stored according to a set of (X, Y) coordinates with reference to an origin. An origin may be the (X, Y) coordinate located at (0, 0). In one embodiment the origin may be located at the center of a display screen. In another embodiment the origin may be located at a corner of the display screen. Each window may have a window origin located somewhere on the window that defines the window location. Each window may also have a window length and a window height that defines the size of the window at the specified window location. Window modification program 30 may retrieve coordinate and window dimension information for each window from the window manager or operating system. Based on the retrieved coordinate and window dimension information for each window, window modification program 30 may determine where windows overlap, as well as the amount of overlap. Window modification program may then instruct the window manager or operating system to change the coordinate or window dimension information for one or more windows to eliminate or reduce window overlap.

Once the window or windows have been redrawn, the window manager may notify applications using each respective window that the display settings have changed. Consequently, either the application using the window or the window manager can also redraw the document displayed in the window so that the contents, or any portion thereof, are displayed in the region inside of the display area.

In decision 340, user-initiated function 40 determines whether the display settings are going to be stored based upon the storage preference information received in step 320. If the storage preference information received in step 320 indicates that the display settings are not to be saved (decision 340, no branch), then user-initiated function 40 is complete. However, if the information received in step 320 indicates that the display settings are to be saved (decision 340, yes branch), then information about second display 110, information about the contents of the window, and the display settings applied to the window when the window is displayed on second display 110 are added to a list of stored display settings located on characteristic list file 70 (step 350). After the display settings have been stored, user-initiated function 40 is complete.

As would be clear to one of ordinary skill in the art, the particular step order may be arranged in any manner that accomplishes a similar result. For instance, the display settings may be stored prior to, or at the same time as, the redrawing of the selected window.

Under certain circumstances, a window may be selected to be modified that already corresponds to a set of saved display settings. When display settings chosen to be saved will conflict with previously stored display settings for the selected window, user-initiated function 40 may send a notification to UI 60 to alert the user of the previously stored display settings. Such a notification may be sent to UI 60 in the form of a popup or modal window. Some embodiments of the present invention may require input from the user to confirm their action before overwriting previously stored display settings. Another embodiment may automatically overwrite any conflicting information and display settings without sending a prompt to UI 60.

Figure 4:
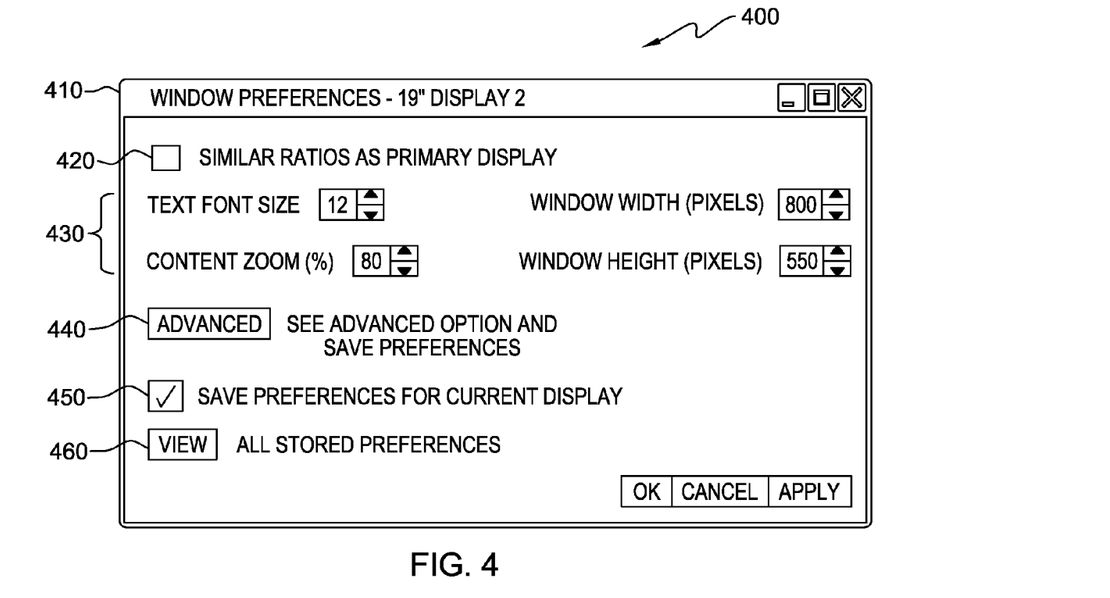
FIG. 4 is an exemplary user interface to the window modification program of FIG. 3 in accordance with one embodiment of the present invention.

FIG. 4 is an exemplary user interface to window modification program 30 executing user-initiated function 40 in accordance with one embodiment of the present invention. User interface window 400 may be a user interface to window modification program 30 executing user-initiated function 40 on computing device 20 of FIG. 1. User interface window 400 may have been sent to UI 60 during step 310, as discussed with respect to FIG. 3. User interface window 400 allows a user to select various display settings to apply to a selected window as rendered on a particular display. User interface window 400 also allows a user to select display setting save preferences. In the depicted embodiment, user interface window 400 is shown as viewed by a user after the user has selected a window to be modified.

In an embodiment of the present invention, user-initiated function 40 will cause user interface window 400 to appear on UI 60 when a window has been selected to be modified. User interface window 400 includes title bar 410, selection box 420, option fields 430, advanced option button 440, save selection box 450, and view button 460. Title bar 410 contains a title describing the function of the window, and will also contain the name of the display on which the selected window resides. Information that may also appear on title bar 410 includes the size, resolution and model number of the display. In another embodiment, user interface window 400 may have an option to select the display to which the display settings for the selected window will be applied.

Selection box 420 gives a user an option to render the selected window according to similar ratios as the window would appear on the primary display. When selected, this option will select settings that redraw the window on the second display so that the window size and content scope or zoom is similar to how the window originally appeared on the primary display. FIG. 2A illustrates this concept. As seen in FIG. 2A, text window 220 is moved from first display 100 to second display 110 and redrawn as text window 220'. Despite the different sizes and potentially different resolutions of first display 100 and second display 110, text window 220 and text window 220' are equal in actual size and scope to a user viewing each display.

In order to generate images of similar size and scope, display driver information may be read in order to gather the data required to perform the necessary mathematical calculations. Information required to perform the necessary calculations include screen size, aspect ratio, and resolution. Alternatively, dots per inch (DPI) information may be obtained. If the driver information does not contain the necessary information, a first embodiment may grey out and not allow for the selection of selection box 420. A second embodiment may prompt the user for the missing information. For instance, a user may be using a projector to display a desktop on a screen. Window modification program 30 may recognize the need for the display size to perform the necessary calculations and may prompt the user to input the physical size of the viewing area.

Option fields 430 contain display setting options for the selected window. Options include font size, window width and height in pixels, and window content zoom or scope.

Advanced button 440 includes additional window customization options such as font type, color, and contrast options for displays with different color and brightness capabilities. Advanced button 440 may also contain a grayscale option that will optimize the image in the window for reproduction on a black and white display. Additionally, there may be a two color option for displays only capable of displaying two colors, such as the LCD display of a scientific calculator. Advanced button 440 may also contain options to scale objects embedded within a window. For instance, a minimum font size option may adjust text font below the selected minimum font size. Advanced button 440 may also contain an option to reduce or eliminate window overlap with respect to a particular window or set of windows. Advanced button 440 may also contain different save preference options. For instance, display settings may be saved so that they are applied to a particular file, file type, web page (by URL or lower level domain), application, or program.

Selection box 450 gives a user the option to store the display settings for that specific window as rendered on the specified display listed on title bar 410. If the window contains a web page, the specific URL of that exact page will be associated with the selected settings. If the window contains a file or document, then the filename will be similarly associated. Advanced button 440 contains additional options and save settings. These options may include the ability to save display settings for a file type (e.g., .avi, .txt, .doc, .jpeg), program (e.g., word processor, web browser, spreadsheet), property of a window (e.g., embedded video, font size above/below 12 point font), lower level domain, or URL containing certain types of content. Metadata, or meta tags commonly used to describe web page content, may be used by window modification program 30 to analyze the content type of a URL address. Additional embodiments may include other ways to link display settings to groups of files, URLs, or programs.

View button 460 of exemplary user interface window 400 opens up a list of stored display settings that allows a user to view and edit display settings previously stored. View button 460 of exemplary user interface window 400 may open up an exemplary list of stored display settings 500, as referenced in FIG. 5.

Figure 5:
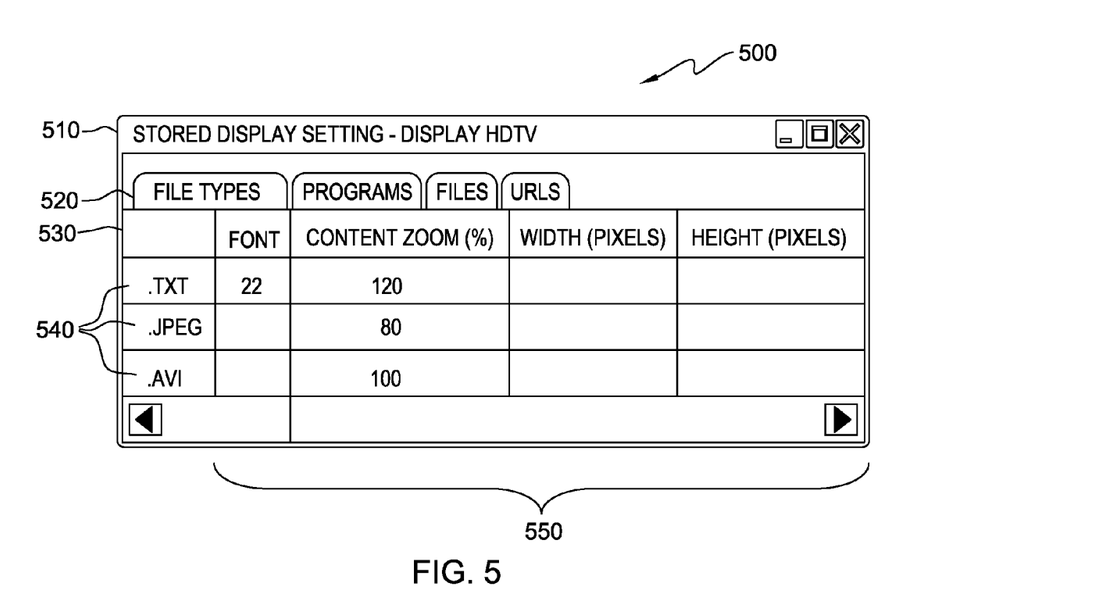
FIG. 5 is an exemplary list of stored display settings of the window modification program of FIG. 3, in accordance with one embodiment of the present invention.

FIG. 5 is an exemplary list of stored display settings in accordance with one embodiment of the present invention. In response to a save preferences request, user-initiated function 40 will store the window display settings and may link those settings to a specific file, URL, file type, program or other piece of window content information. For instance, in a multi-display setup, in response to a window being moved from first display 100 to second display 110, automatic function 50, as discussed in further detail in reference to FIG. 6, will compare the moved window's content to the files, URLs, file types, programs, or other window content information on exemplary list of stored display settings 500. If the moved window's contents match stored window content information, the window will automatically be redrawn according to the associated display settings for second display 110. Exemplary list of stored display settings 500 may be stored on characteristic list file 70 of FIG. 1.

Exemplary list of stored display settings 500 contains title bar 510, tabs 520, display setting headings 530, window content information 540, and stored display settings 550. Exemplary list of stored display settings 500 is stored on characteristic list file 70 and may be stored on at least one of computer-readable tangible storage devices 830 of internal components 800 of FIG. 7. Title bar 510 contains the title describing the function of the window, and will also contains the display (e.g., second display 110) on which the display settings take effect. Title bar 510 may also contain other information such as the size, resolution or model number of the associated display device. Additional embodiments may have an option that allows the user to view the stored preferences of multiple displays. Tabs 520 allow for organization of different types of stored window content within exemplary list of stored display settings 500. Window content information 540 may include specific programs, file types, individual files, or other aspects of window content. Each window content information entry 540 is associated with at least one stored display setting 550. Stored display settings 550 include those display settings previously discussed such as scaling factor, font type, font size, minimum font size, content zoom, window width, and window height. Additional embodiments of the present invention may include additional display settings.

An automatic program, such as automatic function 50 of computing device 20 of FIG. 1, may use window content information 540 and its associated display settings 550 to determine whether a window should be redrawn according to different display settings. Automatic function 50 is discussed in detail in reference to FIG. 6.

Figure 6:
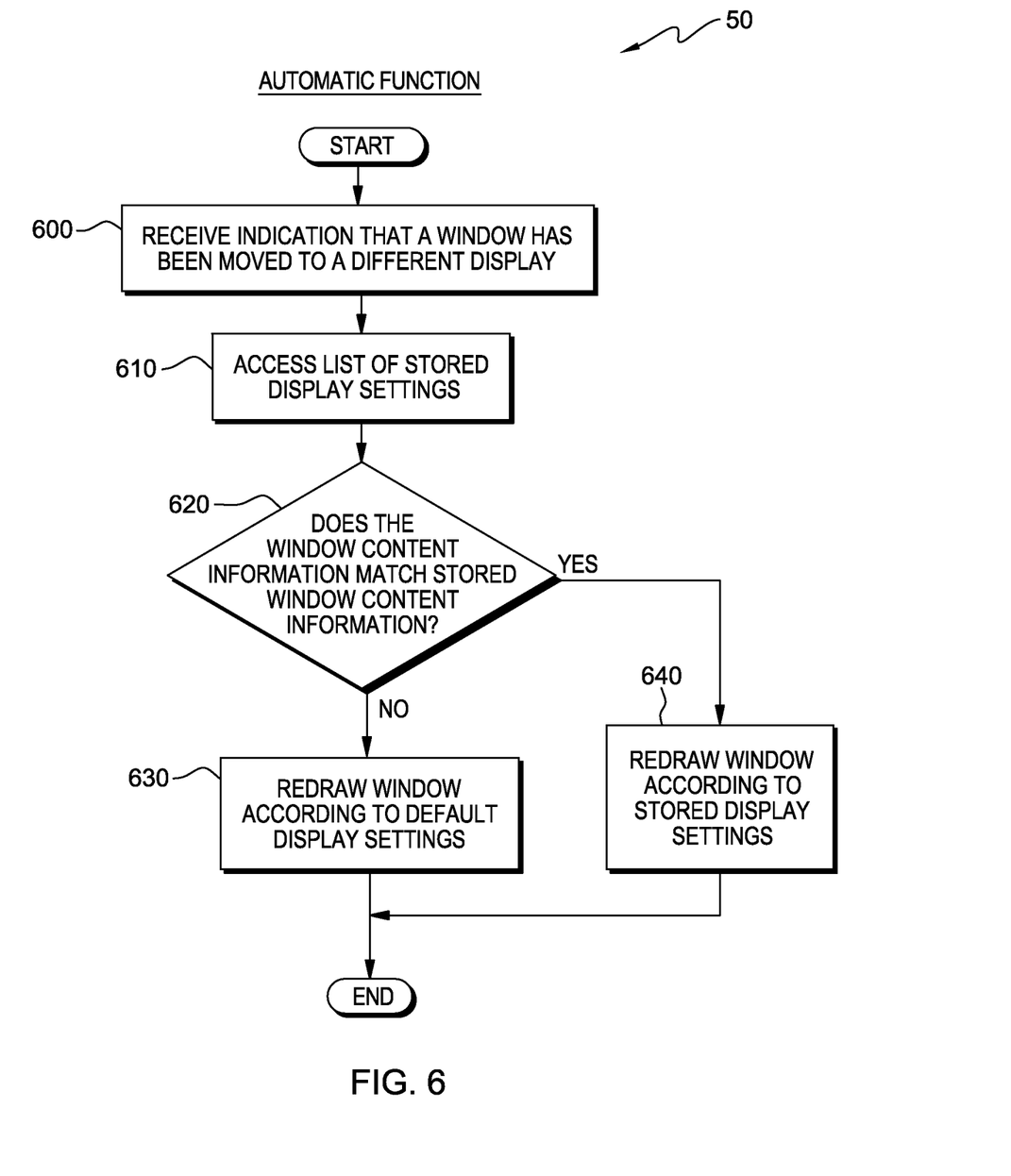
FIG. 6 depicts a flowchart of the steps of the window modification program of FIG. 3 executing an automatic function within the computing system of FIG. 1, for redrawing a window according to previously stored display settings after the window has been moved to a different display in a multi-display setup in accordance with one embodiment of the present invention.

FIG. 6 depicts a flowchart of the steps of automatic function 50 of window modification program 30 executing within computing system 10 of FIG. 1, for redrawing a window according to previously stored display settings after the window has been moved to a different display in a multi-display setup, in accordance with one embodiment of the present invention.

In one embodiment, initially, a user at computing device 20 opens a desktop window such as a web browser, text document, or picture using UI 60 on first display 100. The user then drags or moves the window to second display 110 using UI 60. When the window has been dragged or moved to second display 110 a notification is sent to automatic function 50 of window modification program 30 from the operating system. A similar notification will be sent each time the window is dragged to a different display, including when it has been dragged back to first display 100. In another embodiment, the operating system may send a notification to automatic function 50 that a window is open on a particular display. The notification received by automatic function 50 will contain window content information and properties of the display.

In step 600, automatic function 50 receives the notification that a window has been moved from first display 100 to second display 110 along with window content information and properties of second display 110. In response to receiving the notification, automatic function 50 will call characteristic list file 70 to access a list of stored display settings for second display 110 (step 610).

The list of stored display settings accessed in step 610 will contain display settings that are associated with a particular file, program, URL or other aspect of window content. For instance, embodiments of the present invention may associate stored display settings to a file type, type of data, group of files, or directory. An exemplary list of stored display settings according to the present invention is illustrated by FIG. 5.

In one embodiment, the list of stored display settings contains display settings previously chosen by a user. In another embodiment, the list of stored display settings may be preset by the developer or publisher. In yet another embodiment, the list of stored display settings may be previously selected based on information obtained about the user, such as a disability or eye condition. For instance, display settings may be stored that assist individuals who are colorblind or have poor eyesight. Stored display setting profiles may exist for each type of disability. A profile for someone who is colorblind may use different colors or more contrasting colors. A profile for a user with poor eyesight may increase the font size and content zoom of the window contents. As user may input their particular condition through an embodiment of user-initiated function 40 using UI 60 and a stored display setting profile may exist for the condition.

In another embodiment, the list of stored display settings may be compiled by an organization or other third party and stored on a server accessible to automatic function 50. Such an organization or third party may request data from window modification program 50 users, in order to compile display settings most regularly selected by users, and compile a list of stored display settings accessible to users who opt-in to the service. An organization or third party may request that stored display settings in characteristic list file 70 be sent to a central server. Information within characteristic list file 70 may be compared to information within other characteristic list files and the organization or third party may use this data to create a master characteristic list file that may be accessible to multiple users.

In step 620, automatic function 50 determines whether window content information of the moved window matches window content information on the list of stored display settings for second display 110. Window content information may be stored by a particular filename, web page (URL), or lower level domain. Window content information may also be stored by file type, program, or the data content of the window. Stored window content information will correspond to at least one of the previously mentioned display settings.

If automatic function 50 determines that the window content information of the moved window does not match window content information on the list of stored display settings for second display 110, (decision 620, no branch), automatic function 50 redraws or instructs the operating system to redraw the moved window according to the default settings of the operating system, window manager, or other default controlling function of computing device 20 (step 630).

If automatic function 50 determines that the window content information of the moved window does match window content information on the list of stored display settings for second display 110, (decision 620, yes branch), automatic function 50 redraws or instructs the operating system to redraw the window according to the display settings associated with the matching window content information (step 640).

Once the window has been redrawn, the window manager may notify applications using the window that the display settings have changed. Consequently, either the application using the window or the window manager can also redraw the document displayed in the window so that the contents, or any portion thereof, are displayed in the region inside of the display area.

A particular window may correspond to multiple and conflicting sets of display settings in a list of stored display settings. In one embodiment of the present invention, automatic function 50 may prompt the user of the conflicting instructions through a popup window to UI 60. The popup window may prompt a user to select the set of display settings that should be applied. In another embodiment, automatic function 50 may have an internal decision order. For example, if the corresponding item is the particular file name, the display settings that correspond to that file name would take precedent over any conflicting display settings that match the file type or program being run. In some embodiments, the internal decision order may be changed and customized based upon user preferences.

Figure 7:
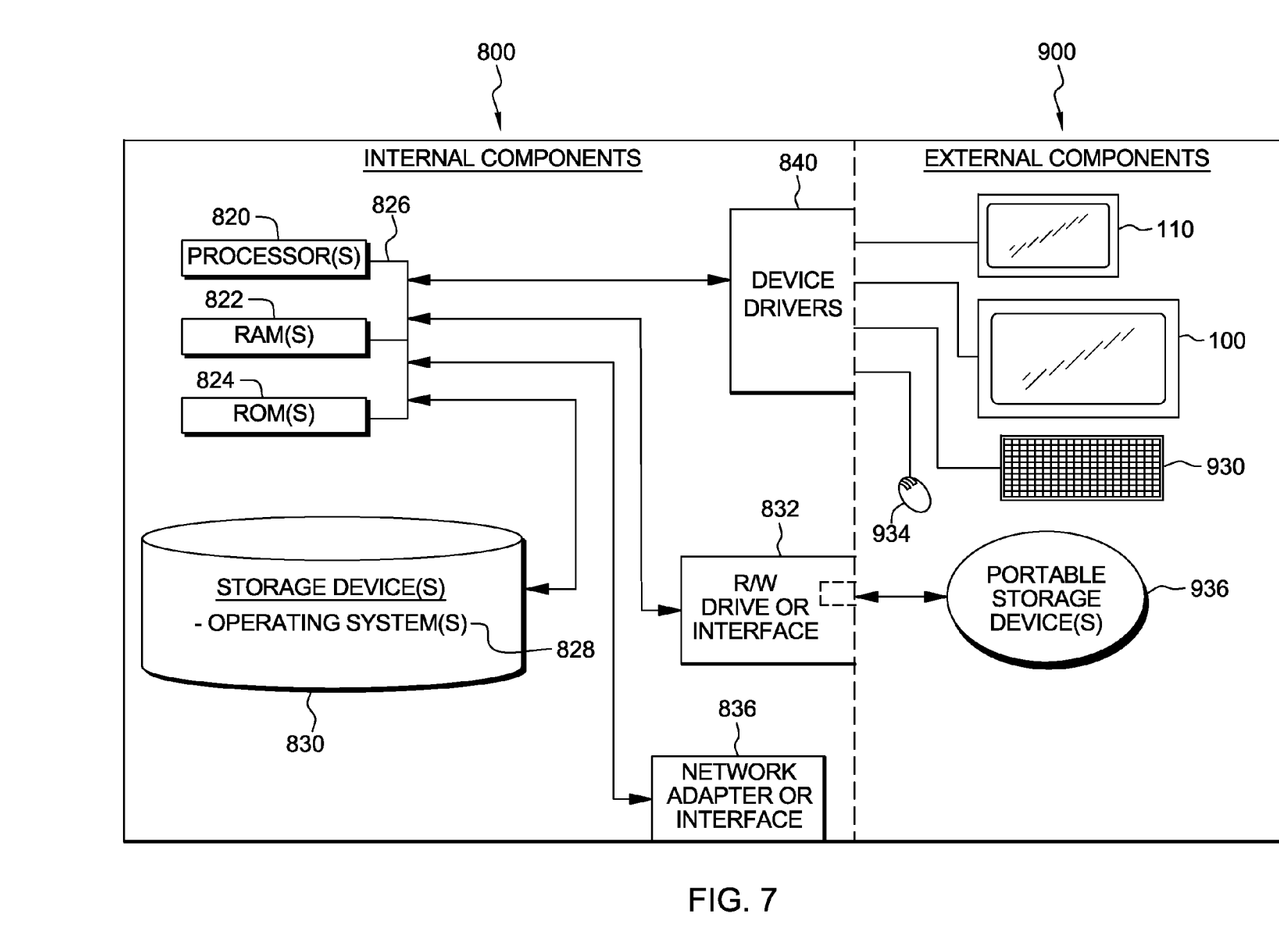
FIG. 7 is a block diagram of internal and external components of the computing device of FIG. 1 in accordance with one embodiment of the present invention.

FIG. 7 is a block diagram of internal and external components of computing device 20 in accordance with one embodiment of the present invention.

Computing device 20 include a set of internal components 800 and external components 900 illustrated in FIG. 7. The set of internal components 800 includes one or more processors 820, one or more computer-readable RAMs 822 and one or more computer-readable ROMs 824 on one or more buses 826, one or more operating systems 828 and one or more computer-readable storage devices 830. The one or more operating systems 828, window modification program 30, user-initiated function 40, automatic function 50, UI 60, and characteristic list file 70 are stored on one or more of the respective computer-readable storage devices 830 for execution and/or access by one or more of the respective processors 820 via one or more of the respective RAMs 822 (which typically include cache memory).

In the embodiment illustrated in FIG. 7, each of the computer-readable storage devices 830 is a magnetic disk storage device of an internal hard drive. Alternatively, each of the computer-readable storage devices 830 is a semiconductor storage device such as ROM 824, EPROM, flash memory or any other computer-readable storage device that can store but does not transmit a computer program and digital information.

The set of internal components 800 also includes a R/W drive or interface 832 to read from and write to one or more portable computer-readable storage devices 936 that can store but do not transmit a computer program, such as a CD-ROM, DVD, memory stick, magnetic tape, magnetic disk, optical disk or semiconductor storage device. Window modification program 30, user-initiated function 40, automatic function 50, UI 60, and characteristic list file 70 can be stored on one or more of the respective portable computer-readable storage devices 936, read via the respective R/W drive or interface 832 and loaded into the respective hard drive or semiconductor storage device 830. The term "computer-readable storage device" does not encompass a copper cable, optical fiber or wireless media, to propagate signals.

The set of internal components 800 also includes a network adapter or interface 836 such as a TCP/IP adapter card or wireless communication adapter (such as a 4G wireless communication adapter using OFDMA technology). Window modification program 30, user-initiated function 40, automatic function 50, UI 60, and characteristic list file 70 can be downloaded to the respective computing/processing devices from an external computer or external storage device via a network (for example, the Internet, a local area network or other, wide area network or wireless network) and network adapter or interface 836. From the network adapter or interface 836, the programs are loaded into the respective hard drive or semiconductor storage device 830. The network may comprise copper wires, optical fibers, wireless transmission, routers, firewalls, switches, gateway computers and/or edge servers The set of external components 900 includes a first display 100, a second display 110, a keyboard or keypad 930, and a computer mouse or touchpad 934. The sets of internal components 800 also includes device drivers 840 to interface to first display 100 and second display 110 for imaging, to keyboard or keypad 930, to computer mouse or touchpad 934, and/or to display screen for pressure sensing of alphanumeric character entry and user selections. The device drivers 840, R/W drive or interface 832 and network adapter or interface 836 comprise hardware and software (stored in storage device 830 and/or ROM 824).

The programs can be written in various programming languages (such as Java, C+) including low-level, high-level, object-oriented or non object-oriented languages. Alternatively, the functions of the programs can be implemented in whole or in part by computer circuits and other hardware (not shown).

Based on the foregoing, a method, program product and computer system has been disclosed for adjusting window display settings in a multi-display setup. However, numerous modifications and substitutions can be made without deviating from the scope of the present invention. Therefore, the present invention has been disclosed by way of example and not limitation.

What is claimed is:

1. A method for redrawing a first web page window addressed by a first URL and a second web page window addressed by a second URL, moved from a first display screen to a second display screen, the method comprising the steps of:
   receiving an indication that a first web page window and a second web page window are to be opened on a first display screen;
   identifying, by one or more processors, from a configuration file:
   a first scaling factor corresponding to a first URL of the first web page window and the first display screen; and
   a second scaling factor corresponding to a second URL of the second web page window and the first display screen;
   displaying, on the first display screen, the first web page window scaled according to the first scaling factor, and the second web page window scaled according to the second scaling factor;
   receiving a selection of:
   a third scaling factor corresponding to the first URL of the first web page window and a second display screen; and
   a fourth scaling factor corresponding to the second URL of the second web page window and the second display screen;
   writing, by one or more processors, the third scaling factor and the fourth scaling factor to the configuration file;
   receiving an indication that:
   the first web page window is being moved from the first display screen to the second display screen; and
   the second web page window is being moved from the first display screen to the second display screen;
   identifying, by one or more processors, from the configuration file:
   the third scaling factor corresponding to the first URL of the first web page window and the second display screen; and
   the fourth scaling factor corresponding to the second URL of the second web page window and the second display screen; and
     displaying, on the second display screen, (a) the first web page window scaled according to the third scaling factor and (b) the second web page window scaled according to the fourth scaling factor, wherein a ratio between the first scaling factor and the second scaling factor is different than a ratio between the third scaling factor and the fourth scaling factor.

2. The method of claim 1, wherein the scaling factor is a setting for font size for text within a window.

3. The method of claim 1, wherein the scaling factor is a setting for scope of content within a window.

4. The method of claim 1, further comprising the step of:
   determining, by one or more processors, that at least a portion of the first web page window will overlap at least a portion of the second web page window or another web page window on the second display screen based on the third and fourth scaling factors for the first and second web page windows, respectively, without repositioning the first, second or other web page windows, and in response, repositioning at least one of the first, second or other web page windows on the second display screen to reduce or avoid the overlap.

5. The method of claim 1, further comprising the steps of:
   receiving window content information of the first web page window; and
   receiving display properties of the second display, wherein the display properties of the second display include the identity of the second display.

6. The method of claim 1, wherein the third scaling factor and the fourth scaling factor are selected prior to receiving the content of the first web page window or the content of the second web page window.

7. The method of claim 1, further comprising:
   receiving an indication that a third web page window is being moved from the first display screen to the second display screen;
   identifying, by one or more processors, a fifth scaling factor based on a compiled list of display settings most regularly selected by a plurality of users; and
   displaying, on the second display, the third web page window scaled according to the fifth scaling factor.

8. The method of claim 1, wherein the second display screen is a projection generated by a projector, further comprising:
   prompting, by one or more processors, for a physical size of the second display screen; and
   receiving the physical size of the second display screen.

9. A computer program product for redrawing a first web page window addressed by a first URL and a second web page window addressed by a second URL, moved from a first display screen to a second display screen, the computer program product comprising:
   one or more computer-readable storage devices and program instructions stored on the one or more computer-readable storage devices, the program instructions comprising:
   program instructions to receive an indication that a first web page window and a second web page window are to be opened on a first display screen;
   program instructions to identify, from a configuration file:
   a first scaling factor corresponding to a first URL of the first web page window and the first display screen; and
   a second scaling factor corresponding to a second URL of the second web page window and the first display screen;
   program instructions to display, on the first display screen, the first web page window scaled according to the first scaling factor, and the second web page window scaled according to the second scaling factor;
   program instructions to receive a selection of:
   a third scaling factor corresponding to the first URL of the first web page window and a second display screen; and
   a fourth scaling factor corresponding to the second URL of the second web page window and the second display screen;
   program instructions to write the third scaling factor and the fourth scaling factor to the configuration file;

program instructions to receive an indication that:
  the first web page window is being moved from the first display screen to the second display screen; and
  the second web page window is being moved from the first display screen to the second display screen;
program instructions to identify from the configuration file:
  the third scaling factor corresponding to the first URL of the first web page window and the second display screen; and
  the fourth scaling factor corresponding to the second URL of the second web page window and the second display screen; and
program instructions to display, on the second display screen, (a) the first web page window scaled according to the third scaling factor and (b) the second web page window scaled according to the fourth scaling factor, wherein a ratio between the first scaling factor and the second scaling factor is different than a ratio between the third scaling factor and the fourth scaling factor.

10. The computer program product of claim 9, wherein the scaling factor is a setting for font size for text within the first window displaying the web page.

11. The computer program product of claim 9, wherein the scaling factor is a setting for scope of content within a window.

12. The computer program product of claim 9, further comprising:
  program instructions, stored on the one or more computer-readable storage devices, to determine that at least a portion of the first web page window will overlap at least a portion of the second web page window or another web page window on the second display screen based on the third and fourth scaling factors for the first and second web page windows, respectively, without repositioning the first, second, or other web page windows; and
  program instructions, stored on the one or more computer-readable storage devices, to reposition at least one of the first, second or other web page windows on the second display screen to reduce or avoid the overlap.

13. The computer program product of claim 9, further comprising:
  program instructions, stored on the one or more computer-readable storage devices, to receive window content information of the first web page window; and
  program instructions, stored on the one or more computer-readable storage devices, to receive display properties of the second display, wherein the display properties of the second display include the identity of the second display.

14. The computer program product of claim 13, wherein the program instructions to identify from the configuration file the first scaling factor corresponding to the first URL of the first web page window and the second scaling factor corresponding to the second URL of the second web page window comprise:
  program instructions to access a list of stored display settings, wherein the list comprises one or more entries of stored window content information corresponding to stored display settings;
  program instructions to determine that the window content information of the first window displaying the web page matches one entry of the one or more entries of stored window content information; and
  program instructions to determine the scaling factor from the list of stored display settings that correspond to the one entry of the one or more entries of stored window content information.

15. A computer system for redrawing a first web page window addressed by a first URL and a second web page window addressed by a second URL, moved from a first display screen to a second display screen, the computer program product comprising:
  one or more computer processors, one or more computer-readable memory devices, one or more computer-readable storage devices, and program instructions stored on the computer-readable storage devices for execution by at least one of the one or more processors via the one or more memory devices, the program instructions comprising:
  program instructions to receive an indication that a first web page window and a second web page window are to be opened on a first display screen;
  program instructions to identify, from a configuration file:
    a first scaling factor corresponding to a first URL of the first web page window and the first display screen; and
    a second scaling factor corresponding to a second URL of the second web page window and the first display screen;
  program instructions to display, on the first display screen, the first web page window scaled according to the first scaling factor, and the second web page window scaled according to the second scaling factor;
  program instructions to receive a selection of:
    a third scaling factor corresponding to the first URL of the first web page window and a second display screen; and
    a fourth scaling factor corresponding to the second URL of the second web page window and the second display screen;
  program instructions to write the third scaling factor and the fourth scaling factor to the configuration file;
  program instructions to receive an indication that:
    the first web page window is being moved from the first display screen to the second display screen; and
    the second web page window is being moved from the first display screen to the second display screen;
  program instructions to identify from the configuration file:
    the third scaling factor corresponding to the first URL of the first web page window and the second display screen; and
    the fourth scaling factor corresponding to the second URL of the second web page window and the second display screen; and
  program instructions to display, on the second display screen, (a) the first web page window scaled according to the third scaling factor and (b) the second web page window scaled according to the fourth scaling factor, wherein a ratio between the first scaling factor and the second scaling factor is different than a ratio between the third scaling factor and the fourth scaling factor.

16. The computer system of claim 15, wherein the scaling factor is a setting for font size for text within a window.

17. The computer system of claim 15, wherein the scaling factor is a setting for scope of content within a window.

18. The computer system of claim 15, further comprising:
  program instructions, stored on the one or more computer-readable storage devices for execution by at least one of the one or more processors via the one or more memory devices, to determine that at least a portion of the first web page window will overlap at least a portion of the second web page window or another web page window on the second display screen based on the first and second scaling factors for the first and second web page windows, respectively, without repositioning the first, second or other web page windows; and program instructions, stored on the one or more computer-readable storage devices for execution by at least one of the one or more processors via the one or more memory devices, to reposition at least one of the first, second or other web page windows on the second display screen to reduce or avoid the overlap.

19. The computer system of claim 15, further comprising:
program instructions, stored on the one or more computer-readable storage devices for execution by at least one of the one or more processors via the one or more memory devices, to receive window content information of the first web page window; and program instructions, stored on the one or more computer-readable storage devices for execution by at least one of the one or more processors via the one or more memory devices, to receive display properties of the second display, wherein the display properties of the second display include the identity of the second display.

20. The computer system of claim 19, wherein program instructions to identify from the configuration file the first scaling factor corresponding to the first URL of the first web page window and the second scaling factor corresponding to the second URL of the second web page window comprise:
program instructions to access a list of stored display settings, wherein the list comprises one or more entries of stored window content information corresponding to stored display settings;

program instructions to determine that the window content information of the first window displaying the web page matches one entry of the one or more entries of stored window content information; and program instructions to determine the scaling factor from the list of stored display settings that correspond to the one entry of the one or more entries of stored window content information.

* * * * *